United States Patent
Hodgson

[15] 3,691,737
[45] Sept. 19, 1972

[54] TECHNIQUE FOR RECOVERING SEA MOSS AND THE LIKE

[72] Inventor: William S. Hodgson, 52 Fort Hill St., Hingham, Mass. 02043

[22] Filed: Sept. 30, 1970

[21] Appl. No.: 76,688

[52] U.S. Cl. .................................................56/9
[51] Int. Cl. ...........................................A01d 45/08
[58] Field of Search.........................................56/9, 8

[56] References Cited

UNITED STATES PATENTS

| 2,320,283 | 5/1943 | Knowlton et al. | 56/9 |
| 2,907,162 | 10/1959 | Rebikoff | 56/9 |
| 1,571,395 | 2/1926 | Clark | 56/9 |

FOREIGN PATENTS OR APPLICATIONS

| 785,747 | 5/1935 | France | 56/9 |

Primary Examiner—Antonio F. Guida
Attorney—Wolf, Greenfield and Sacks

[57] ABSTRACT

A method and apparatus for harvesting marine vegetation such as sea moss which tends to grow on and about submerged rocks and the like. The device employed in practising the invention includes a flexible hose having a specially constructed harvester head attached to one end. Water is pumped through the hose at a substantial velocity to develop a substantial suction at the submerged harvesting head. When the harvesting head is moved adjacent a sea moss plant, the plant is ingested into the head. The drag on the ingested plant which is developed by the water flow is insufficient to break the bushy part of the plant from the stem but does impart a firm, steady pull on the plant. The harvester head includes a specially formed inlet opening having a reversely bent flow path which is defined by a pair of spaced, parallel edges. The edges in the harvester head engage the stem of the ingested plant to cause the stem to wrap about the edges in a general S-shaped configuration. The wrapping of the stem about the edges in combination with the firm steady drag on the ingested bushy portion of the plant firmly grips the stem. Thus, when the head is pulled, the stem breaks at its weakest point. The separated portion of the plant than flows through the hose to a collecting net or other appropriate collecting device.

23 Claims, 6 Drawing Figures

INVENTOR
WILLIAM S. HODGSON
BY
Wolf, Greenfield, & Sacks
ATTORNEYS

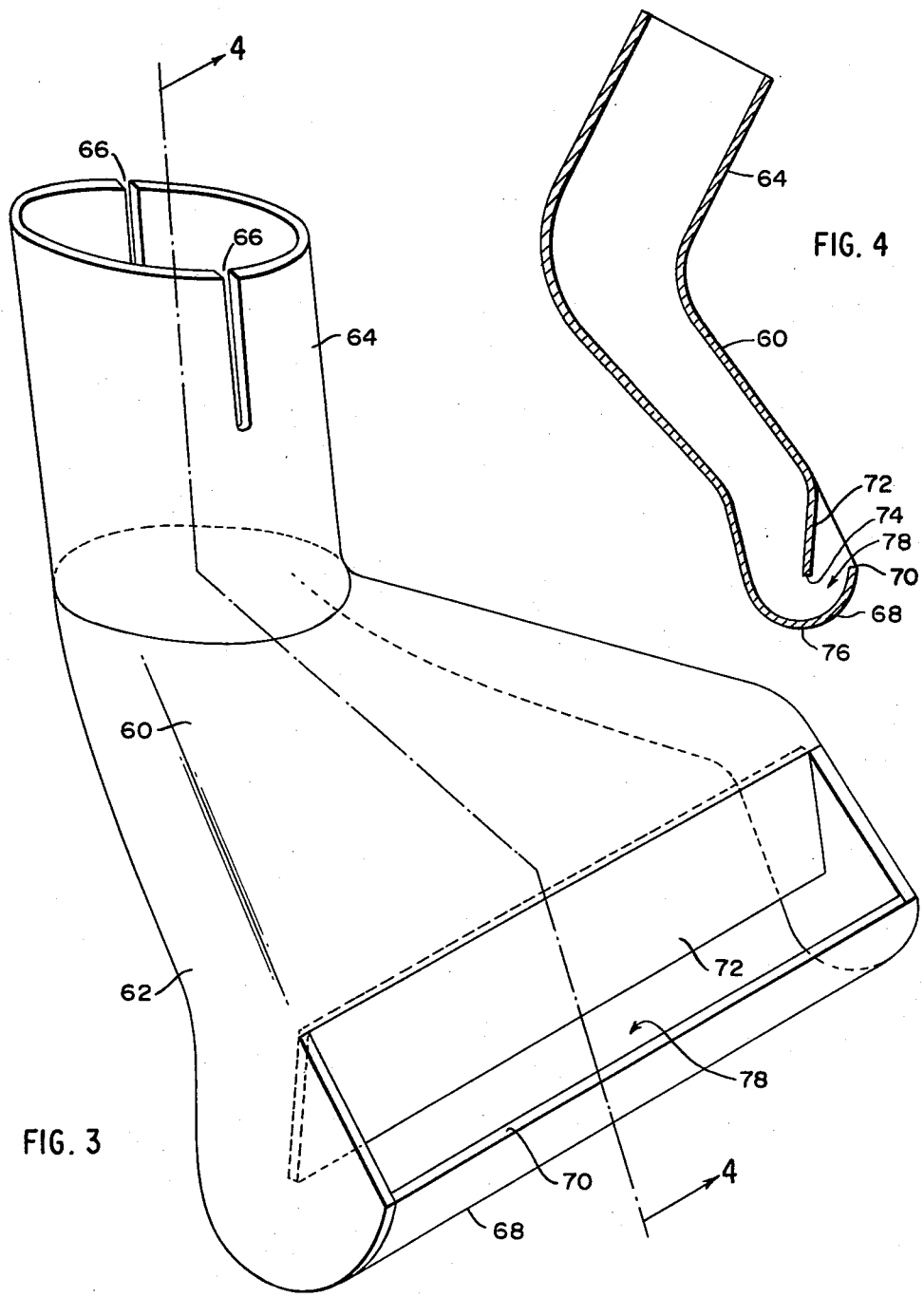

TECHNIQUE FOR RECOVERING SEA MOSS AND THE LIKE

BACKGROUND OF THE INVENTION

This invention relates to the harvesting of marine vegetation and, more particularly, to the harvesting of a particular marine plant known as condruscripispus, also more commonly known as sea moss or Irish moss. Certain extracts which are obtainable in abundance from sea moss are used widely for a variety of purposes. For example, carrageenan, a natural sugar, is one of the primary extracts of sea moss. Carrageenan is used widely in food and other products as a tasteless, colorless stabilizer. For example, carrageenan in employed in ice cream, mayonnaise, gelatinous puddings, milk and many other food products. It also is used widely in toothpaste, ink, jellies, ointments, plastic explosives, lipstick and cosmetics. These are but a few of the increasing number of products which employ derivatives of sea moss. Because of the ever increasing uses being developed for the sea moss derivatives, it is becoming increasingly important to develop improved and more efficient harvesting techniques.

Sea moss traditionally has been harvested manually and in relatively shallow waters. The traditional technique has been for the harvester, from a small boat, to pass a rake through the bed of sea moss. He then lifts the rake and entrapped sea moss from the water and manually removes the sea moss from the rake. Numerous efforts have been made in the prior art to develop a more efficient harvesting technique than that of manual raking. Despite the increasing demand requirements for sea moss and its derivatives, a feasible, more efficient technique has not yet been developed.

Most of the devices proposed have included machinery or moving parts which were intended to operate mechanically while submerged. For example, underwater clippers or trimmers have been proposed. Another proposed technique has been to employ cooperative rollers to grip and pinch the moss from the rocks. Among other unsuccessful techniques have been those in which large areas of sea moss, found at greater depth were to be harvested. Those techniques require many men some of whom are underwater divers. The mechanical problems encountered with the prior techniques apparently have been insurmountable as evidenced by the fact that harvesting still is done manually with the special harvesting rakes. It is among the primary objects of the invention to provide a simple, yet effective technique for harvesting sea moss in a manner which overcomes the foregoing difficulties.

SUMMARY OF THE INVENTION

Irish moss grows in abundance in cold water as found in the North Atlantic and other similar zones throughout the world. The moss plant includes a stem which attaches to a rock by a portion known as the holdfast. The other end of the stem includes a bushy head or frond. When harvesting the sea moss, great care must be taken to remove only the frond and, perhaps, the upper portion of the stem. The lower portion of the stem and the holdfast must remain intact. If the holdfast is torn from the rock, the sea moss will not regenerate. Thus, unless great care is taken in harvesting a crop of sea moss, an entire bed may be destroyed permanently.

The sea moss stem is structured with a naturally weakened region along the stem between the frond and the holdfast. Because of this naturally weak region, the frond may be gripped and pulled and the stem will tear at the weakened region with the holdfast remaining intact on the rock. It is this natural weakened region of the plant which permits manual rake harvesting to be effective without destroying the plant. In this regard, it should be noted that one of the main difficulties encountered with some of the prior mechanized or automated techniques has been that they have not been sensitive to the weakened region along the plant stem and often have separated the holdfast from the rock.

My invention provides a technique by which the fronds of the plants may be recovered without damaging the plants and in a manner which is highly efficient. An important aspect of the invention is that after the harvester has torn the frond from the remainder of the stem, the separated frond is automatically conveyed to a storage bin without requiring the harvester to remove the device from the water and then manually remove the separated fronds from the rake.

In brief, the invention includes a specially designed harvester head located at the inlet of a flexible hose. The other, outlet end of the hose is connected to an eductor which induces a steady flow of water through the submerged harvester head and hose. The harvesting head is connected to the end of a long pole to enable the operator to draw the harvester head over and through the bed of sea moss from his boat. The sea moss is ingested into the head together with the water. The flow passage within the harvester head is of special design in which the flow path is reversed in a generally U-shaped configuration. The U-shaped flow path is defined by a pair of spaced edges which are arranged so that when the frond of the plant is ingested, the stem wraps about the spaced edges in a generally S-shaped configuration. The combined effect of the drag on the bushy frond of the plant developed by the water flowing through the hose and the reversed S-shaped wrap of the stem about the spaced edges in the head effects a firm grip on the stem. The operator then simply tugs at the head which develops a tension within the stem sufficient to break the stem at its weak portion.

Once the frond and upper portion of the stem have been separated, the continued water flow carries the separated frond to the outlet end of the hose where it is collected. In contrast to the conventional raking technique, the head need never be removed from the water which enables the harvesting operation to be continuous and uninterrupted.

Among the primary objects of the invention is to provide an improved automated and feasible technique for harvesting sea moss.

Another object of the invention is to provide an improved method and apparatus for harvesting sea moss in shallow water at a relatively rapid rate which avoids the need for underwater divers and which may be operated by one person from within a boat.

A further object of the invention is to provide an automated device for harvesting sea moss in which the harvested moss is automatically transported to a storage location without requiring any effort on the part of the harvester. This enables the harvester to utilize all of his time in separating the fronds of the sea moss plants.

Still another object of the invention is to provide a method and apparatus for harvesting sea moss which avoids the use of any movable mechanical parts underwater.

DESCRIPTION OF THE DRAWINGS

These and other objects and advantages of the invention will be understood more fully from the following detailed description thereof with reference to the accompanying drawings wherein;

FIG. 3 is an illustration of the underside of the harvesting head;

FIG. 4 is a sectional view of the harvesting head as seen along the lines 4—4 of FIG. 3;

DESCRIPTION OF THE PREFERRED EMBODIMENT

Figure 1:
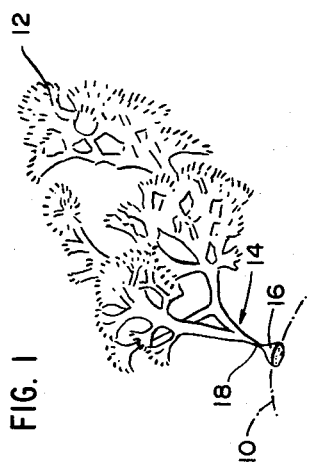
FIG. 1 is an illustration of a sea moss plant.

FIG. 1 shows the elements of the sea moss plant and the manner in which it attaches to a submerged rock 10. The plant includes a bushy frond 12 which grows from the stem 14. The stem 14 attaches to the rock 10 by the holdfast 16. An intermediate portion of the stem 14 between the holdfast 16 and the frond 12 is naturally weak so that when the frond 12 or upper part of the stem 14 is pulled, the stem will tend to tear at the weakened region 18. This leaves the holdfast 16 and lower portion of the stem 14 intact and on the rock which enables the plant to regenerate within its normal regeneration cycle of approximately two to three months.

Figure 2:
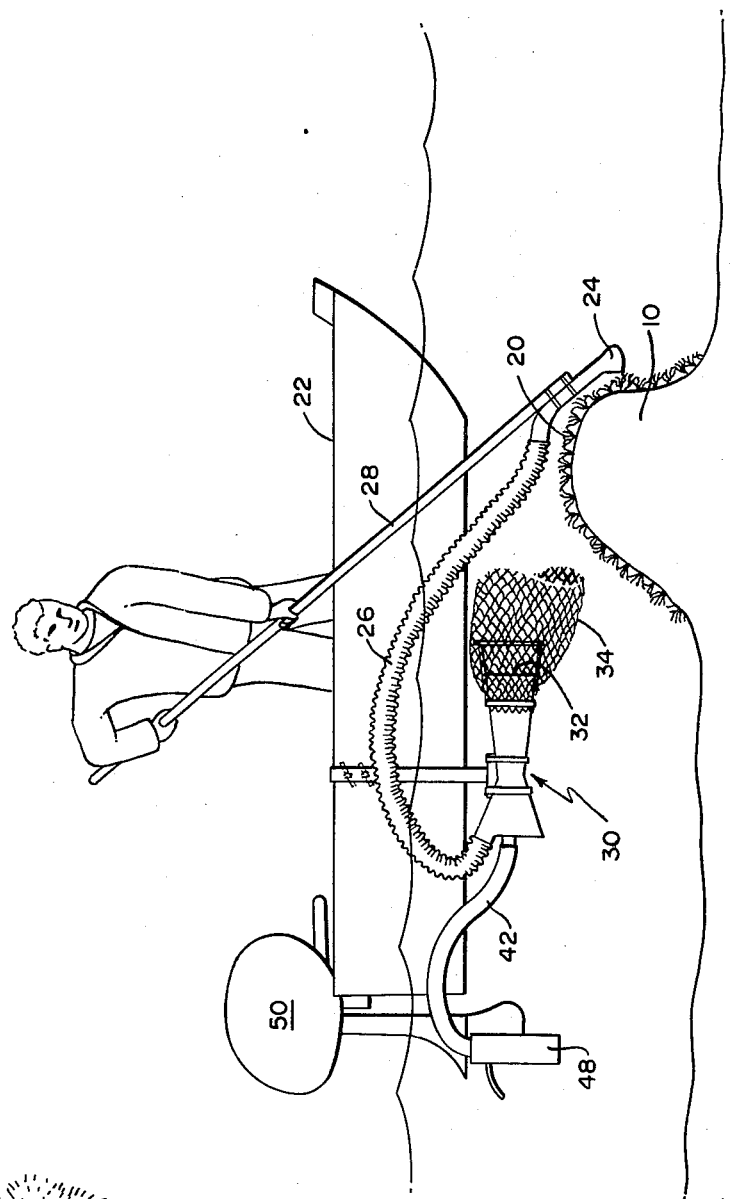
FIG. 2 is an illustration of a boat equipped with the harvesting device and illustrating the manner in which the sea moss is harvested in accordance with the invention.

As shown in FIG. 2, the sea moss plants tend to grow in dense groups or patches 20 about submerged rocks or other submerged members. Harvesting of the sea moss is normally done during a period of low tide when the sea moss patches are readily accessible and can be seen by the harvester from his boat 22. Because of the relatively compact size of the invention and its capability of being operated by a single harvester, a relatively small boat having a shallow draft may be employed. This is desirable in that it provides the harvester with substantial mobility in shallow waters where the most abundant moss patches are found.

As shown in FIG. 2, the device includes a specially constructed harvester head 24 which is connected to the end of a flexible hose 26. The harvester head 24 is connected to the end of the long pole 28 which the operator uses to manipulate the head 24 and draw it through the sea moss patch 20 as suggested in the drawing. The other end of the flexible hose 26 is connected to an eductor, indicated generally by the reference character 30 which develops a reduced pressure at the outlet end of the hose 26 thus inducing water to flow through the harvester head and hose 26. The outlet 32 of the eductor 30 is provided with a collecting net 34 which entraps any of the fronds 12 which have been ingested into the hose 26 and through the eductor 30.

Figure 5:
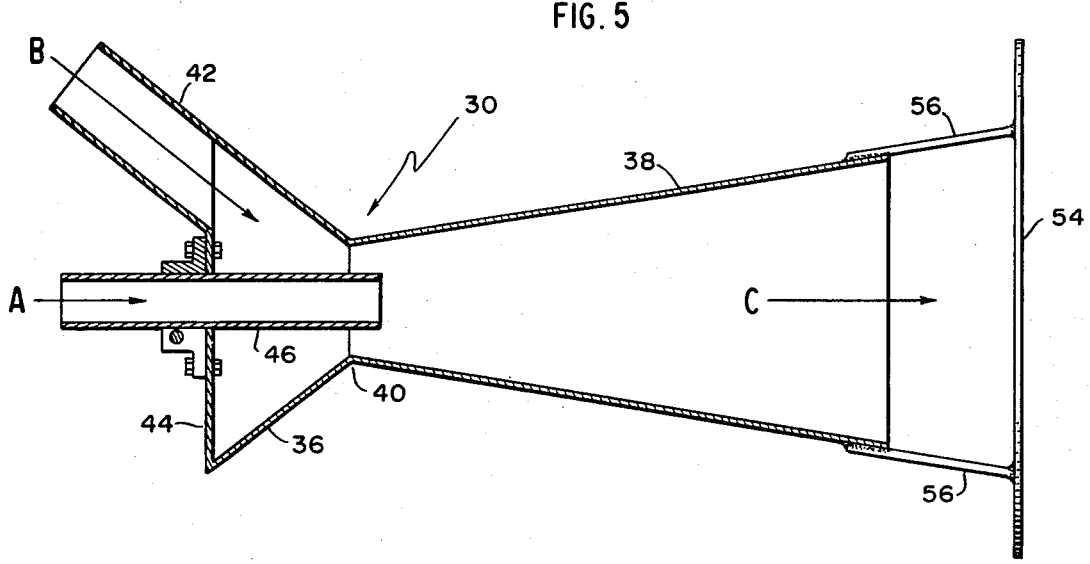
FIG. 5 is a sectional view through the eductor.

The eductor 30, shown in cross section in FIG. 5, is of a venturi-type construction having a convergent upstream end 36 and a divergent downstream end 38 which are joined at a neck 40 of reduced cross-sectional area. The end of the flexible hose 26 is connected to an inlet tube 42 which is secured to or formed integrally with the converging upstream end 36 of the eductor 30. The eductor 30 also includes a rear wall 44 which blocks the upstream end. The various parts of the eductor preferably are formed from a corrosive-resistant material such as stainless steel and may be of welded construction. The eductor 30 is operated by a high velocity water jet introduced into the eductor through a jet pipe 46 which passes through and is secured to the rear wall 44. The outlet end of the jet pipe 46 is positioned adjacent the neck 40 of the eductor so that when water is pumped through the jet pipe 46 at a substantial velocity, the static pressure in the region of the neck will be reduced which, in turn, induces flow through the inlet tube 42, hose 26 and head 24.

Any number of arrangements may be employed for pumping water through the jet pipe. In the preferred embodiment shown in FIG. 2, the water jet is developed by a centrifugal pump 48 which may be driven by an output shaft of a conventional outboard motor 50. The pump 48 is connected to the external end of the jet pipe 46 by an appropriate internally smooth hose 52.

The jet pipe 46 may be secured permanently and firmly to the eductor or may be mounted for axial adjustment to permit the outlet end of the jet pipe 46 to be positioned precisely in relation to the neck of the eductor as to achieve the maximum pressure drop within the eductor. A variety of arrangements may be employed for this purpose, such as the split ring as shown.

The outlet end 32 of the eductor also may be provided with a deflector plate 54, supported by the rods 56 so that the plate 54 is spaced from but covers the outlet 32 of the eductor. The deflection plate 54 is desirable to dissipate the axial thrust of the water emitted from the outlet and the collected sea moss plants. This negates any tendency for the jet emitted by the eductor to propel or move the boat about. Additionally, because the water stream is deflected radially and outwardly from the axial path of the eductor this tends to maintain the collection net 34 in a spread, receptive configuration.

FIGS. 3 and 4 show the construction of the special harvester head 24. The head is formed from rigid sheet material which is corrosion resistant and is otherwise suited for use in salt water. A welded stainless steel construction is preferred although other materials may be employed. The head 24 includes top and bottom walls 58, 60 and sidewalls 62. The sidewalls 62 preferably are tapered to converge in a downstream direction. The converging regions of the walls 58, 60 and 62 are integrally connected to a connector tube 64. The connector tube 64 preferably is disposed at a substantial angle to the flow path defined by the walls 58, 60 and 62. The tube 64 may be provided with slots 66 to facilitate connection to the hose 26 by a clamp tightly wrapped about the tubes 64 and inlet end of the hose 26.

The configuration of the inlet end of the head is of particular importance. The inlet end includes a somewhat U-shaped wall portion which may be formed integrally with and as an extension of the top wall 58. The wall portion 68 curls downwardly and back toward the connector tube 64 and terminates in a transverse edge 70. The bottom wall 60 includes the transversely extending extension 72 which may be formed integrally with the bottom wall 60 or may be secured thereto as a separate element. The extension includes a transverse edge 74 which parallels the edge 70.

The extension 72 is disposed at an angle to the bottom wall 60 and projects generally toward the bight 76 of the curved wall portion 68. Thus, the region between the spaced transverse edges 70, 74 define a transversely extending inlet opening 78 for the head. When water is ingested through the head, it flows through the opening 78 and then along a curved flow path as guided by the curved wall portion.

Figure 6:
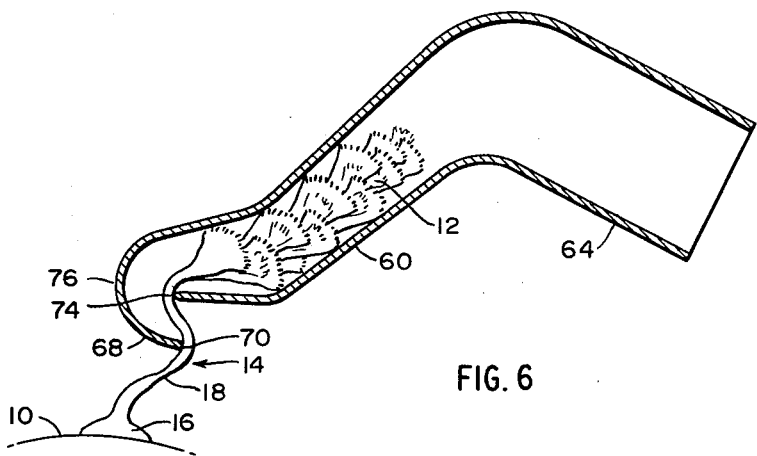
FIG. 6 is a sectional view showing the harvesting head in operative relation to a plant.

In the preferred embodiment of the invention, the head is constructed so that the edges 70, 74 are disposed in relation to each other and in relation to the direction of the flow downstream of the opening between the walls 58, 60, and 62 so that when a plant is ingested into the head as shown in FIG. 6, the stem will be wrapped about the transverse edges 70, 74 in a reversely bent or generally S-shaped configuration. The bushy frond 12 located within the head develops a substantial amount of drag as a result of the water flowing through the head and about the frond 12. The amount of pull or drag imparted to the plant, however, is less than that which would be required to tear the stem 12 at its weakened region 18. The drag developed is, however, sufficient to retain the frond firmly. The reversely bent configuration of the stem 12 about the transverse edges 70, 74 increases substantially the frictional force with which the plant is gripped.

After a plant has been ingested into the head as shown in FIG. 6, the operator simply tugs on the head which causes the stem 14 to tear at the weakened region 18. The weakened region may be located exteriorly of the head or may be located within the head. When the plant is gripped by the combined effects of the drag on the frond 12 and the reverse bend in the stem, pulling on the head will impart a tension along the stem which will have its greatest effect at the weakened region 18. The frong is removed from the lower portion of the stem by a tearing action which is permitted by the combined gripping effects of the drag on the frond 12 and the reversely bent configuration of the stem about the edges 70, 74. It should be noted that the edges 70, 74 are blunt and are not sharpened to perform any cutting function.

Once the stem has been severed at its weakened region, the severed portion of the plant is immediately drawn together with the water upwardly through the hose 26, through the eductor 30 and into the collecting net 34. The operator need not lift the head out of the water to remove any of the harvested plants. This enables the operation to be continuous and permits a substantially larger yield to be achieved within a given time period than has been obtained with conventional raking techniques. In this regard it may be noted that approximately 10 percent of an efficient raker's time is employed in actual raking through the moss bed. The remainder of his time is utilized to lift the rake from the water, remove the collected moss from the rake and then to return the rake to the water for the next pass. In contrast, with my invention, the harvesting head is not removed from the water but, instead, is used effectively to gather and sever the plants in continuous operation. The severed plants are collected automatically. An additional feature of the head construction is that the elongate, generally rectangular, configuration of the inlet opening precludes ingestion of large foreign materials such as stones and the like. I have found that by limiting the width of the inlet opening to approximately three-quarters of an inch most undesirable foreign matter will be excluded while the sea moss plants may be ingested freely into the head.

An important feature of the invention is that there are no moving mechanical elements or devices along the flow circuit which might become clogged. The water is pumped through the head and hose as a result of the dynamic pressures developed in the eductor.

Thus, I have described a method and apparatus for harvesting sea moss in which the moss plant is gripped by the combined effects of wrapping the stem about a member and the drag imparted to the frond and in which the harvested plant is automatically collected without requiring removal of the harvester head from the water. Additionally, the harvester head separates the upper portion of the plant without any mechanical moving parts which eliminates the possibility of wear, jamming or other malfunction. The invention permits the harvester to pass the head through a bed of moss and collect a substantial quantity of moss in a single sweeping motion without removing the head from the water.

It should be understood that although the foregoing description of the invention has been directed primarily for a technique to harvest sea moss efficiently in shallow waters, the invention also may be practised to harvest sea moss in deep, offshore waters. When practising the invention in deep waters, the technique would require the use of underwater divers to manipulate the harvesting head along the sea bottom. The appropriate hoses and conduits would be long enough to reach the bottom and provide the required freedom of motion.

It should be understood, however, that the foregoing description of the invention is intended merely to be illustrative thereof and that other embodiments and modifications may be apparent to those skilled in the art without departing from its spirit. For example, although in the preferred embodiment of the invention, the frictional grip on the stem is effected by reversely bending the stem about a pair of spaced members or surfaces, the invention may, in some instances, be practiced by causing the stem to be wrapped about a single surface or member which in combination with the drag imparted to the plant is effective to enable the subsequent tugging of the head to tear the stem at its weakest region. The stem-engaging surface, however, should release the separated portion of the plant as soon as separation is effected to enable the separated portion to be transported to the collection area.

Having thus described the invention, what I desire to claim and secure by Letters Patent is:

1. A method for harvesting marine plants having a frond and a stem secured to a submerged member comprising:

providing a conduit having an outlet end and a submergible inlet end;

locating said inlet end of said conduit in proximity to said marine plant;

ingesting said marine plant into said inlet by developing water flow within said conduit through the inlet end thereof;

maintaining a firm drag about said ingested plant by continuing said water flow through said conduit;

wrapping the stem portion of said plant about a pair of spaced surfaces in a reversely bent configuration to frictionally grip said wrapped portion of said stem, said firm drag on said plant and said wrapping of said stem cooperating to effect a firm grip on said plant; and tugging on the inlet end of said conduit to tension said stem along its length and effect separation thereof at the weakest point of said stem.

2. A method for harvesting marine plants as defined in claim 1 wherein said spaced surfaces comprise a pair of spaced edges.

3. A method of harvesting marine plants as defined in claim 1 wherein said step of collecting said separated portion of said plant at the other end of said conduit comprises:

providing a collection net about the outlet end of said conduit, said mesh being adapted to entrap the separated plant portions emitted from the conduit outlet but permitting the water emitted from said conduit to pass therethrough.

4. A method of gripping a marine plant having a frond and a stem secured to a submerged member in readiness to pull said plant and separate said plant along its stem comprising:

providing a conduit having an inlet end and developing a continuous water flow through said conduit;

locating the inlet end of said conduit in proximity to said plant to ingest said plant and maintain a steady pull on said plant in response to the drag developed by said water stream through said conduit;

constraining said stem of said plant in a reversely bent wrapped configuration about a pair of members adjacent the inlet of said conduit whereby the combined effects of said drag on said plant and said engagement of said stem with said members will effect a sufficient grip on said plant to enable the plant to be separated along its stem in response to subsequent tugging on the inlet end of said conduit.

5. A method of gripping a plant as defined in claim 4 wherein said step of said constraining said plant stem and said reversely bent configuration comprises:

providing a pair of spaced members at and defining the inlet of said conduit, said spaced members being disposed in relation to the portion of said conduit downstream of said inlet to guide said stem in said reversely bent configuration.

6. A method of harvesting a marine plant having a frond and a stem secured to a submerged member comprising:

imparting a tension to the free, frond end of said plant, said tension being of a magnitude less than that required to tear said stem at the weakest portion thereof;

wrapping said stem about a pair of spaced members in a reversely bent configuration to grip said stem of said plant frictionally, said combined effects of said tensioning of said frond end of said plant and said frictional gripping of said stem portion of said plant being effective to retain said plant firmly; and pulling on said plant to develop a tension in said stem sufficient to break said stem at said weakest portion.

7. A method as defined in claim 6 wherein said tensioning of the frond end of said plant comprises:

subjecting said frond end to a steady, hydrodynamic drag.

8. A head for harvesting submerged marine plants having a frond and a stem attached to a submerged object comprising:

wall means defining a flow passage through said head and an inlet and outlet to enable water to be ingested through said head whereby when said head is located in proximity to said plant, said plant will be ingested into said head through said inlet, the water stream flowing through said head imparting a dynamic drag to said ingested plant;

said wall means defining at least one blunt surface in the region of said inlet which is adapted to engage frictionally the stem of said ingested plant and grip said stem, said dynamic drag and said grip being cooperative to enable said head to be pulled to break said plant at the weakest portion of said stem.

9. A harvesting head as defined in claim 8 wherein said at least one surface for engaging frictionally the stem of said plant is located in relation to said flow passage as to require said stem to be wrapped about said at least one surface when ingested into said head.

10. A harvesting head as defined in claim 8 wherein said surfaces on said head are arranged to constrain said stem in a reversely bent configuration.

11. A harvesting head as defined in claim 10 wherein said wall means defining said head are formed so that the flow path within said head downstream of said inlet is of a generally U-shaped configuration.

12. A harvesting head as defined in claim 11 wherein said surfaces for constraining said stem in a reversely bent configuration comprises:

a first surface formed by one of said walls, said first surface defining a portion of said inlet opening;

a second surface on a wall opposite said one wall, said second surface being spaced from said first surface, said second surface being disposed downstream of said first surface and defining the bight region of said U-shaped flow path.

13. A harvester head as defined in claim 12 wherein said first and second surfaces comprise substantially parallel blunt edges.

14. A harvesting head as defined in claim 13 further comprising:

said wall means including a top wall, a bottom wall and sidewalls defining said flow passage, said bottom wall terminating in a transverse edge at the inlet end of said head;

said top wall having a curved extension portion at the inlet end of said head, said extension being curved downwardly and about said transverse edge of said bottom wall, said extension terminating in a transverse, rearwardly facing edge spaced from said transverse edge of said bottom wall, said transverse edge at the end of said curved extension comprising said first surface and said transverse edge of said bottom wall comprising said second surface.

15. A harvesting head as defined in claim 14 wherein said transverse edges are substantially greater in length than the distance between said spaced edges to define a narrow inlet opening.

16. An apparatus for harvesting submerged marine plants having a frond and a stem attached to a submerged object comprising:

means for imparting a hydrodynamic drag to the frond end of said plant, said drag being of a magnitude which is itself insufficient to break the stem of said plant;

means for gripping the stem of said plant to an extent which itself would be insufficient to enable said stem to be broken by tugging on said gripping means, said gripping means and said hydrodynamic drag being cooperative, in combination, to enable said plant to be pulled under a force sufficient to break said stem at the weakest portion thereof;

said gripping means being adapted to release said plant when said stem is broken;

means for collecting said severed portions of said plants; and means for transporting said severed portions of said plants to said collection means.

17. An apparatus for harvesting submerged marine plants as defined in claim 16 wherein said means for imparting said hydrodynamic drag to said plant comprises:

a flexible hose having an outlet and a submergible inlet;

means for inducing the flow of water through said hose to enable ingestion of said plant at the inlet end thereof, said inlet end being so constructed and arranged to include said means for firmly gripping said ingested plant whereby said stem may be broken is response to a pull imparted on the inlet end of said hose;

said transporting means comprising said hose, said collecting means being located adjacent the outlet end of said hose.

18. An apparatus as defined in claim 17 wherein said means for inducing said water flow comprises:

flow induction means connected to the outlet end of said hose for inducing said flow, said flow induction means being free from moving mechanical parts and presenting an unobstructed flow area therethrough.

19. An apparatus as defined in claim 18 wherein said flow induction means comprises:

a venturi eductor having a neck portion of reduced cross-sectional flow area;

a jet pipe positioned within said eductor and having an outlet end disposed adjacent and within said neck;

means for pumping water through said jet pipe to develop a reduced static pressure within said eductor; and means connecting said outlet of said flexible hose to said eductor upstream of said neck portion thereof whereby said reduced pressure within said eductor will induce flow within said hose to draw water and the separated portion of said plants through said hose, eductor and out of the outlet of said eductor.

20. An apparatus as defined in claim 19 wherein said means for pumping water through said jet pipe to develop said reduced static pressure within said inductor comprises:

a submergible water pump;

means operatively connecting said water pump to the output shaft of an outboard marine engine, said engine being supported to maintain said pump in said submerged condition.

21. An apparatus as defined in claim 19 further comprising:

baffle means secured to the outlet end of said eductor and in spaced relation thereto to receive the thrust of the water ejected from said outlet of said eductor, said baffle being effective to substantially negate the effect of thrust developed by said eductor and preclude boat propulsion.

22. An apparatus as defined in claim 19 wherein said means for collecting said separated plants comprises:

a mesh net secured to the outlet of said eductor to entrap said separated plants.

23. An apparatus as defined in claim 22 further comprising:

baffle means secured to the outlet end of said eductor and in spaced relation thereto to receive the thrust developed by said eductor and to preclude substantially propulsion of said boat thereby.

* * * * *